(12) United States Patent
Pham

(10) Patent No.: US 6,761,516 B2
(45) Date of Patent: Jul. 13, 2004

(54) METHOD FOR GENERATING HOLES IN LAMINATE MATERIALS

(75) Inventor: Doan D. Pham, Renton, WA (US)

(73) Assignee: The Boeing Company, Chicago, IL (US)

( * ) Notice: Subject to any disclaimer, the term of this patent is extended or adjusted under 35 U.S.C. 154(b) by 79 days.

(21) Appl. No.: 10/269,630

(22) Filed: Oct. 11, 2002

(65) Prior Publication Data

US 2004/0071517 A1 Apr. 15, 2004

(51) Int. Cl.[7] ............................................... B23C 1/00
(52) U.S. Cl. ....................... 409/132; 409/143; 409/191; 409/140; 82/1.11; 82/1.4; 82/1.2; 408/1 R; 408/147; 451/28; 451/51
(58) Field of Search ................................. 409/132, 131, 409/143, 65–66, 74, 140, 139, 138, 191, 199, 200; 82/1.11, 1.2, 1.3, 1.4–1.5, 15–17; 408/1 R, 147; 451/28, 51, 61

(56) References Cited

U.S. PATENT DOCUMENTS 4,594,033 A * 6/1986 Peetz et al. ................. 408/156
5,316,419 A * 5/1994 Bohnet et al. .............. 409/143
5,641,252 A * 6/1997 Eriksson et al. ............ 409/132
5,735,650 A * 4/1998 Miyanaga ..................... 82/1.2
5,816,755 A * 10/1998 Thelin ........................ 409/132
6,007,281 A * 12/1999 Eriksson et al. ............ 409/132
6,270,295 B1 * 8/2001 Hyatt et al. ................. 408/1 R

FOREIGN PATENT DOCUMENTS

EP          307823 A2  *  3/1989
GB         2162099 A   *  1/1986
SE          173899 A   *  1/1961

* cited by examiner

Primary Examiner—Erica Cadugan

(57) ABSTRACT

A method of generating holes in fiber-reinforced metal laminate material is provided, including creating a first bore 18 by passing a cutting element 16 from a first side 24 of the fiber-reinforced metal laminate material 10 to a second side 26, the first bore 18 including first bore sidewalls 19 at least a portion of which includes a taper 28 having a taper diameter 33 and a taper depth 32; passing the cutting element 16 through the first bore 18; moving the cutting element 16 outward of the taper diameter 33; and retracting the cutting element 16 through the first bore 18 to create a second bore 34 having straight second bore sidewalls 36.

18 Claims, 1 Drawing Sheet

METHOD FOR GENERATING HOLES IN LAMINATE MATERIALS

TECHNICAL FIELD

The present invention relates generally to a method for generating holes in laminate materials and more particularly to a method for generating holes in fiber-reinforced metal laminates (FML).

BACKGROUND OF THE INVENTION

Laminate materials are used throughout the aircraft/aerospace industry. Laminate materials provide high strength/low weight structural characteristics that are often crucial to aircraft applications and design. One group of laminate materials are known as fiber-reinforced metal laminates (FML). Fiber-reinforced metal laminates are hybrid composites consisting of alternating layers of metal sheets and fiber-reinforced epoxy pre-preg. The FML concept is known to combine the favorable properties of metals and composites while reducing their disadvantages. The aeronautics/aerospace industry has recognized significant weight and cost savings through the utilization of these materials and has discovered that these materials can be applied to many primary structures. Although a wide variety of individual metals and composites may be utilized to form FML materials, one known FML grouping is referred to as titanium graphite FML material.

Although fiber-metal laminates are recognized as providing a variety of costs and weight savings to aircraft structures, they are also known to create difficulties in the manufacturing and processing of structures utilizing them. One such manufacturing difficulty is known to arise during the drilling and/or boring of holes within the FML material. These manufacturing difficulties have been found to increase when performed on titanium/graphite fiber-metal laminate materials. These difficulties commonly take the form of burs and delamination experienced by the titanium/graphite fiber-metal laminate when exposed to the drilling or cutting process.

Resultant burring and delamination can present impediments to many aeronautics/aerospace applications. Localized weaknesses resulting from burring or delamination as a result of drilled holes are often located precisely where weakening can least be afforded. Furthermore, aircraft assemblies often rely on smooth surfaces for improved aerodynamics and increased efficiency. The presence of burring and delamination, therefore, can run counter to these fundamental desires. It would, therefore, be highly desirable to have a method for producing drilled or cut holes within fiber-metal laminate materials that reduced and/or eliminated the production of burs and delamination. It would further be highly beneficial to have a method for producing such burless and delamination free holes that would also improve cutter life and overall cost of manufacture.

SUMMARY OF THE INVENTION

It is, therefore, an object of the present invention to provide a method for creating holes in fiber-metal laminate material with reduced spur direction. It is a further object of the present invention to provide a method for creating holes in fiber-metal laminate materials with reduced incidents of delamination.

In accordance with the objects of the present invention, a method of generating holes in fiber-metal laminate material is provided. The method includes utilizing a cutter to create a first bore in the fiber-metal laminate material. The first bore is created by moving the cutter from a first side of the fiber-metal laminate material to a second side of the fiber-metal laminate material to create the first bore containing at least one tapered portion positioned adjacent the second side of the fiber-metal laminate material. The method further includes passing the cutter through the first bore and taking the cutter outwards of the at least one tapered portion. Finally, the method includes retracting the cutter to the first bore to create a second bore. The second bore has straight sides.

Other objects and features of the present invention will become apparent when viewed in light of the detailed description of the preferred embodiments when taken in conjunction with the attached drawings and appended claims.

DESCRIPTION OF THE PREFERRED EMBODIMENT(S)

Figure 1:
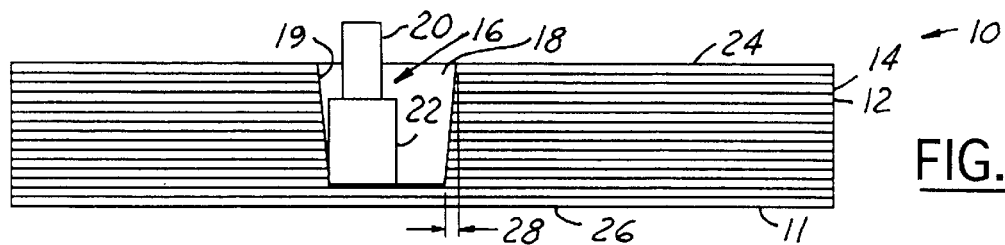
FIG. 1 is an illustration of a method for generating holes in fiber-metal laminate in accordance with the present invention, the illustration indicating the creation of a first bore.
Figure 2:
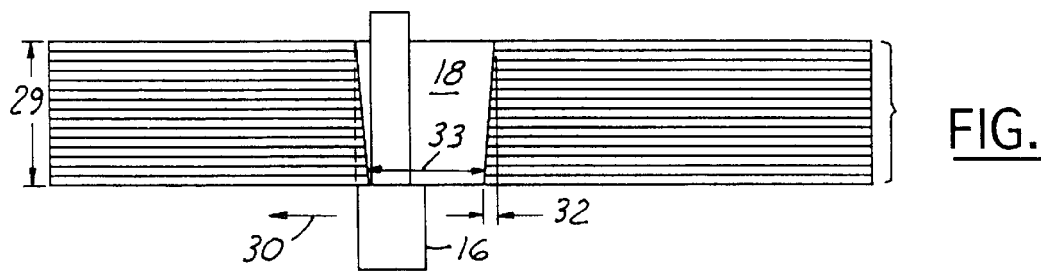
FIG. 2 is an illustration of a method for generating holes in fiber-metal laminate in accordance with the present invention, the illustration depicting kicking out the cutter.
Figure 3:
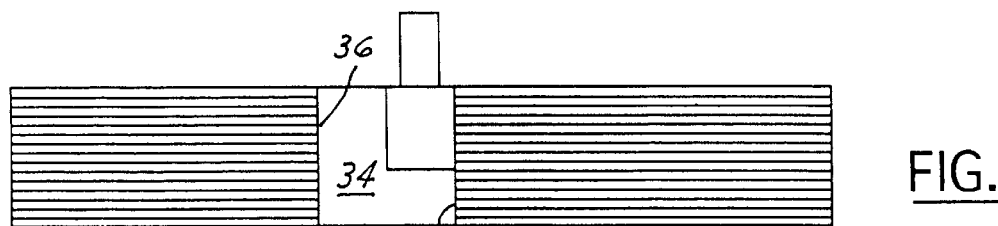
FIG. 3 is an illustration of a method for generating holes in fiber-metal laminate in accordance with the present invention, the illustration depicting the creation of a second bore with straight sides.

Referring now to FIGS. 1–3, which are illustrations of an embodiment of a method for generating holes in fiber-metal laminate materials 10 in accordance with the present invention. Fiber-metal laminates (FML), also known as fiber-reinforced metal laminates, are hybrid composites consisting of alternating layers of metal sheets 12 and fiber-reinforced epoxy pre-preg 14. The metal sheets 12 allow for plastic defamation of the FML material, while the fiber-reinforced epoxy pre-preg 14 gives the FML strength. Although a wide variety of metal sheets 12 bring fiber-reinforced pre-preg 14 are contemplated for use with the present invention, one embodiment contemplates the use of titanium for the metal sheets 12 and graphite fiber for use in the fiber-reinforced pre-preg 14. Although a particular fiber metal laminate material has been described, it should be understood that a wide variety are contemplated by the present invention.

Prior methodologies utilized for generating holes within such fiber-metal laminate materials were known to generate burs and create delamination. The present invention addresses these concerns by creating a first bore 16 using a cutting element 18. A wide variety of cutting elements 18 are contemplated by the present invention. Most commonly, the cutting element 18 consists of a shaft 20 with a milling element 22 mounted at one end. Although the term milling element 22 has been utilized, any drill, milling, or grinding element is intended. The milling element 22 can be comprised of a variety of materials including, but not limited to, carbon or diamond cutting materials. Additionally, although it is contemplated that the cutting element 16 may be controlled in a variety of fashions, one embodiment contemplates using a CNC machine (computerized numerically controlled).

Figure 4:
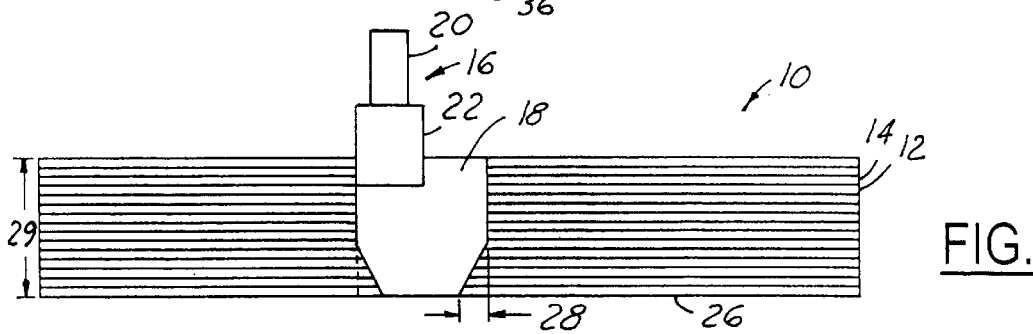
FIG. 4 is an illustration of an alternate embodiment of a method for generating holes in fiber-metal laminate in accordance with the present invention, the illustration indicating the creation of a first bore.
Figure 5:
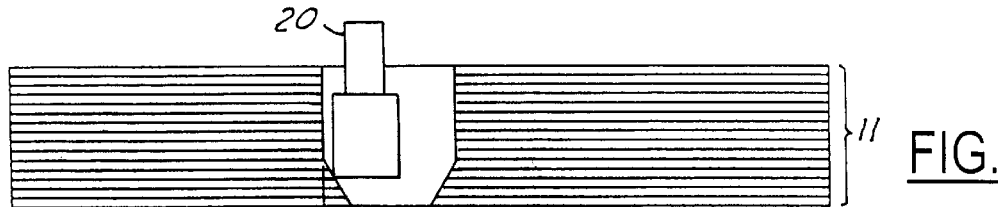
FIG. 5 is an illustration of the method for generating holes illustrated in FIG. 4, the illustration depicting kicking out of the cutter.

The first bore 18 is created by milling the milling element 16 from a first side 24 of the fiber metal laminate 11 to a second side 26 of the fiber metal laminate 11. Wherein prior art methodologies risk the creation of burs or delamination, the present invention helps mitigate such problems by including a taper 28 in at least a portion of the first bore sidewalls 19. Although a variety of tapers 28 are contemplated by the present invention, and would be dictated by the direction of travel of the cutting element 16, the embodiment illustrated with taper 28 is preferably an inward taper. The taper 28 is illustrated in FIGS. 1 and 2 as spanning the entire length 29 of the first bore 18. It should be understood, however, that the taper 28 need only encompass a portion of the first bore 18 as illustrated in FIGS. 4 and 5. When the taper 28 does not encompass the entire length 29 of the first bore 18, it is preferably located at a position adjacent the second side 26 (see FIG. 4).

Figure 6:
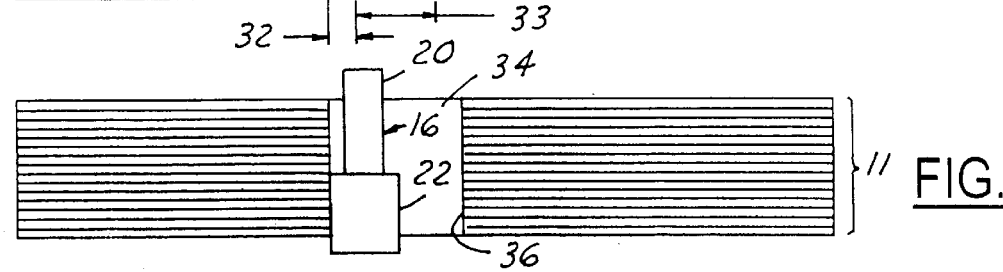
FIG. 6 is an illustration of the method for generating holes illustrated in FIG. 4, the illustration depicting the creation of a second bore with straight seals.

Once a first bore 18 has been generated, the present invention extends the cutting element 16 down through the first bore 18 and kicks it outward 30 of the first bore 18 (see FIG. 2). Although in one embodiment (FIG. 2) the cutting element 16 is passed entirely through the first bore 18 before kicking-out, in alternate embodiments (such as FIG. 5), it is contemplated that the cutting element 16 may be kicked out while remaining in the first bore 18. Although it is contemplated that the cutting element 16 may be kicked outward 30 to varying degrees, one embodiment contemplates the cutting element 16 won't be kicked outward 30 of the taper diameter 33 a distance approximately equal to the taper depth 32 such that when the cutting element 16 is retracted through the first bore 18, a second bore 34 is created having approximately straight second bore sidewalls 36. In cases wherein the cutting element 16 is not passed entirely through the first bore 18 and the taper 28 represents only a small portion of the length 29 of the first bore (see FIGS. 4–6), the second bore 34 may be generated solely by the moving out of the cutting element 16 (FIG. 6). Through the kicking out, retraction, and creation of the second bore 34, any burs or delamination created during the generation of the first bore 18 are cleaned up as the cutting element 16 is retracted through the first bore 18 to create a second bore 34. In addition to the creation of burless and delamination-free holes, the present invention may well improve cutter life and improve the overall cost savings of generating holes in fiber-metal laminate material 11.

In this fashion, and burring or delamination that may occur as the cutting element 16 passes downwards through the second side 26 of the fiber-reinforced metal laminate 11 during the formation of the first bore 18, is removed as the cutting element 16 is retracted through the first bore 18 in the creation of the second bore 34. The cutting element 16 effectively makes an entrance cut on both sides of the material, thus eliminating the possibility of fiber break-out or delamination. This provides both a process with desirable manufacturing time and simplicity. Post processing removal of burrs and treatment of delamination is no longer required as it is directly addressed during, formation of the holes.

Finally, the cutting element 16 can be utilized in traditional milling techniques without the need for excessive horizontal force milling, thereby increasing the effective cutting life and reducing costs associated with manufacturing.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method of generating holes in a laminate material comprising:

creating a first bore by passing a cutting element from a first side of the laminate material to a second side, said first bore including sidewalls at least a portion of which include a taper having a taper diameter and a taper depth;

passing said cutting element through said first bore;

moving said cutting element outward of the taper diameter;

retracting said cutting element through said first bore to create a second bore having substantially straight sides.

2. A method of generating holes in a laminate material as described in claim 1, wherein the laminate material comprises a fiber-reinforced laminate material.

3. A method of generating holes in a laminate material as described in claim 1, wherein the laminate material comprises a titanium graphite fiber-reinforced laminate material.

4. A method of generating holes in a laminate material as described in claim 1, wherein said taper comprises an inward taper, tapering inward in the direction from the first side to the second side of the laminate material.

5. A method of generating holes in a laminate material as described in claim 4, wherein said inward taper is positioned adjacent said second side.

6. A method of generating holes in a laminate material as described in claim 1, wherein said taper spans the length of said first bore.

7. A method of generating holes in a laminate material as described in claim 1, wherein said cutting element is moved outward of said taper diameter in an amount equal to said taper depth.

8. A method of generating holes in a laminate material as described in claim 1, further comprising:

controlling movement of said cutting element using a CNC machine.

9. A method of generating holes in a laminate material as described in claim 1, wherein said cutting element comprises a shaft and a milling element.

10. A method of generating holes in a fiber-reinforced metal laminate material comprising:

creating a first bore by passing a cutting element from a first side of the fiber-reinforced metal laminate material to a second side, said first bore including first bore sidewalls at least a portion of which includes a taper having a taper diameter and a taper depth;

moving said cutting element outward of said taper diameter; and retracting said cutting element through said first bore to thereby generate a second bore having straight sidewalls.

11. A method of generating holes in fiber-reinforced metal laminate material as described in claim 10, further comprising:

passing said cutting element through said first bore prior to said moving said cutting element outward of said taper diameter.

12. A method of generating holes in a fiber-reinforced metal laminate material as described in claim 10, wherein the fiber-reinforced fiber laminate material comprises a titanium graphite fiber-reinforced laminate material.

13. A method of generating holes in a laminate material as described in claim 10, wherein said taper comprises an inward taper, tapering inward in the direction from the first side to the second side of the laminate material.

14. A method of generating holes in a fiber-reinforced metal laminate material as described in claim 13, wherein said inward taper is positioned adjacent said second side.

15. A method of generating holes in a fiber-reinforced metal laminate material as described in claim 10, wherein said taper spans the length of said first bore.

16. A method of generating holes in a fiber-reinforced metal laminate material as described in claim 10, wherein said cutting element is moved outward of said taper diameter in an amount equal to said taper depth.

17. A method of generating holes in a fiber-reinforced metal laminate material as described in claim 10, further comprising:

controlling movement of said cutting element using a CNC machine.

18. A method of generating holes in a fiber-reinforced metal laminate material as described in claim 10, wherein said cutting element comprises a shaft and a milling element.

* * * * *